US008912877B2

(12) United States Patent  (10) Patent No.: US 8,912,877 B2
Ling et al.  (45) Date of Patent: Dec. 16, 2014

(54) SYSTEM AND METHOD FOR ACTIVATING AN ELECTRONIC DEVICE USING TWO OR MORE SENSORS

(75) Inventors: Spencer Ling, Toronto (CA); Antonio Chan, Milton (CA)

(73) Assignee: BlackBerry Limited, Waterloo, Ontario (CA)

( * ) Notice: Subject to any disclaimer, the term of this patent is extended or adjusted under 35 U.S.C. 154(b) by 260 days.

(21) Appl. No.: 13/030,584

(22) Filed: Feb. 18, 2011

(65) Prior Publication Data

US 2012/0212319 A1  Aug. 23, 2012

(51) Int. Cl.
 *G05B 23/02* (2006.01)
 *G01J 5/00* (2006.01)
 *G06F 1/26* (2006.01)
 *G06F 1/32* (2006.01)

(52) U.S. Cl.
 CPC ............ *G06F 1/3203* (2013.01); *G06F 1/3231* (2013.01)
 USPC ........ 340/3.1; 374/E1.023; 374/133; 713/320

(58) Field of Classification Search
 USPC ............... 713/320; 374/E1.023, 133; 340/3.1
 See application file for complete search history.

(56) References Cited

U.S. PATENT DOCUMENTS

| | | | | |
|---|---|---|---|---|
| 5,017,019 | A * | 5/1991 | Pompei .......................... | 374/133 |
| 6,650,322 | B2 * | 11/2003 | Dai et al. ....................... | 345/212 |
| 2002/0029146 | A1 | 3/2002 | Nir | |
| 2002/0080132 | A1 | 6/2002 | Dai et al. | |
| 2003/0085870 | A1 * | 5/2003 | Hinckley ....................... | 345/156 |
| 2005/0018747 | A1 * | 1/2005 | Takehara ........................ | 374/45 |
| 2005/0035955 | A1 * | 2/2005 | Carter et al. ................... | 345/175 |
| 2005/0088296 | A1 * | 4/2005 | Lee ........................... | 340/539.12 |
| 2007/0054651 | A1 * | 3/2007 | Farmer et al. ................. | 455/352 |
| 2007/0143060 | A1 * | 6/2007 | Chiu ............................. | 702/131 |
| 2007/0250126 | A1 | 10/2007 | Maile et al. | |
| 2008/0108340 | A1 * | 5/2008 | Karstens ....................... | 455/418 |
| 2008/0234935 | A1 | 9/2008 | Wolf et al. | |
| 2008/0272836 | A1 | 11/2008 | Smit et al. | |
| 2009/0059730 | A1 | 3/2009 | Lyons et al. | |
| 2009/0091536 | A1 | 4/2009 | Callaghan | |
| 2009/0118590 | A1 | 5/2009 | Teller et al. | |
| 2009/0135002 | A1 | 5/2009 | Blinnikka et al. | |
| 2009/0153189 | A1 | 6/2009 | Kirk et al. | |
| 2009/0177068 | A1 | 7/2009 | Stivoric et al. | |
| 2009/0240118 | A1 | 9/2009 | Aggarwal | |
| 2009/0243829 | A1 | 10/2009 | Lin et al. | |
| 2009/0259865 | A1 | 10/2009 | Sheynblat et al. | |
| 2009/0261978 | A1 | 10/2009 | Lee et al. | |

(Continued)

OTHER PUBLICATIONS

Gellersen, H.W., et al.: Multi-Sensor Context Awareness in Mobile Devices and Smart Artifacts. MONET 7(5): 341-351 (Oct. 2002).

*Primary Examiner* — Benjamin C Lee
*Assistant Examiner* — Adam Carlson
(74) *Attorney, Agent, or Firm* — McCarthy Tétrault LLP

(57) ABSTRACT

The disclosure provides a system and method for activating an electronic device. The activation circuit comprises: a first sensor to monitor for a first condition relating to an environment as affected by a user of the device; a second sensor to monitor for the first condition relating to an environment isolated from effects of the user; and an activation circuit to evaluate signals from the first and second sensors to determine whether to change an activation state of a component on the device. This may involve activating or deactivating the component.

18 Claims, 10 Drawing Sheets

(56) References Cited

U.S. PATENT DOCUMENTS

| | | |
|---|---|---|
| 2009/0264150 A1 | 10/2009 | Andreasson et al. |
| 2009/0265671 A1 | 10/2009 | Sachs et al. |
| 2009/0289189 A1* | 11/2009 | Garland .................. 250/342 |
| 2010/0009650 A1* | 1/2010 | Orr et al. ................ 455/343.1 |
| 2010/0013778 A1* | 1/2010 | Liu et al. .................. 345/173 |
| 2010/0042827 A1* | 2/2010 | Pratt et al. .................. 713/100 |
| 2010/0105423 A1* | 4/2010 | Gupta ...................... 455/550.1 |
| 2010/0105427 A1* | 4/2010 | Gupta ...................... 455/556.1 |
| 2011/0021922 A1* | 1/2011 | Berard-Anderson et al. .................. 600/454 |

* cited by examiner

Fig. 6

| Example User Case | Environmental Conditions | Sensor A₁ + A₂ Activation Scheme | | | | Sensor A₁ + A₂ + B Activation Scheme | | | | | |
|---|---|---|---|---|---|---|---|---|---|---|---|
| | | Positive Activation Condition | Sensor A₁ | Sensor A₂ | \| Sensor A₁ - Sensor A₂ \| | Wakeup (with Threshold > 5) | Sensor A₁ | Sensor A₂ | Temp | Temp adjusted Sensor A₁ | Temp adjusted Sensor A₂ | Temp adjusted Sensor A1-A2 | Wakeup (with Threshold > 5) |
| 1 | Normal Environment (Scenario A) | No | 25 | 25 | 0 | No | 25 | 25 | 28 | 25 | 25 | 0 | No |
| 2 | Normal Environment (Scenario B) | No | 25 | 23 | 2 | No | 25 | 23 | 25 | 25 | 23 | 2 | No |
| 3 | Hot Environment (Scenario A) | No | 40 | 40 | 0 | No | 40 | 40 | 40 | 40 | 40 | 0 | No |
| 4 | Hot Environment (Scenario B) | No | 42 | 38 | 4 | No | 42 | 38 | 38 | 42 | 38 | 4 | No |
| 5 | Cold Environment (Scenario A) | No | 0 | 0 | 0 | No | 0 | 0 | 4 | 0 | 0 | 0 | No |
| 6 | Cold Environment (Scenario B) | No | 0 | 3 | 3 | No | 0 | 3 | 2 | 25 | 3 | 3 | No |
| 7 | Normal Environment (Scenario A) | Yes | 25 | 33 | 8 | Yes | 25 | 33 | 20 | 25 | 33 | 8 | Yes |
| 8 | Normal Environment (Scenario B) | Yes | 25 | 34 | 9 | Yes | 25 | 34 | 20 | 25 | 34 | 9 | Yes |
| 9 | Hot Environment (Scenario A) | Yes | 40 | 34 | 6 | Yes | 40 | 34 | 40 | 40 | 34 | 6 | Yes |
| 10 | Hot Environment (Scenario B) | Yes | 55 | 51 | 4 | No | 55 | 51 | 55 | 55 | 49 | 6 | Yes |
| 11 | Cold Environment (Scenario A) | Yes | 0 | 31 | 31 | Yes | 0 | 31 | 0 | 0 | 31 | 31 | Yes |
| 12 | Cold Environment (Scenario B) | Yes | 0 | 30 | 30 | Yes | 0 | 30 | 0 | 0 | 30 | 30 | Yes |

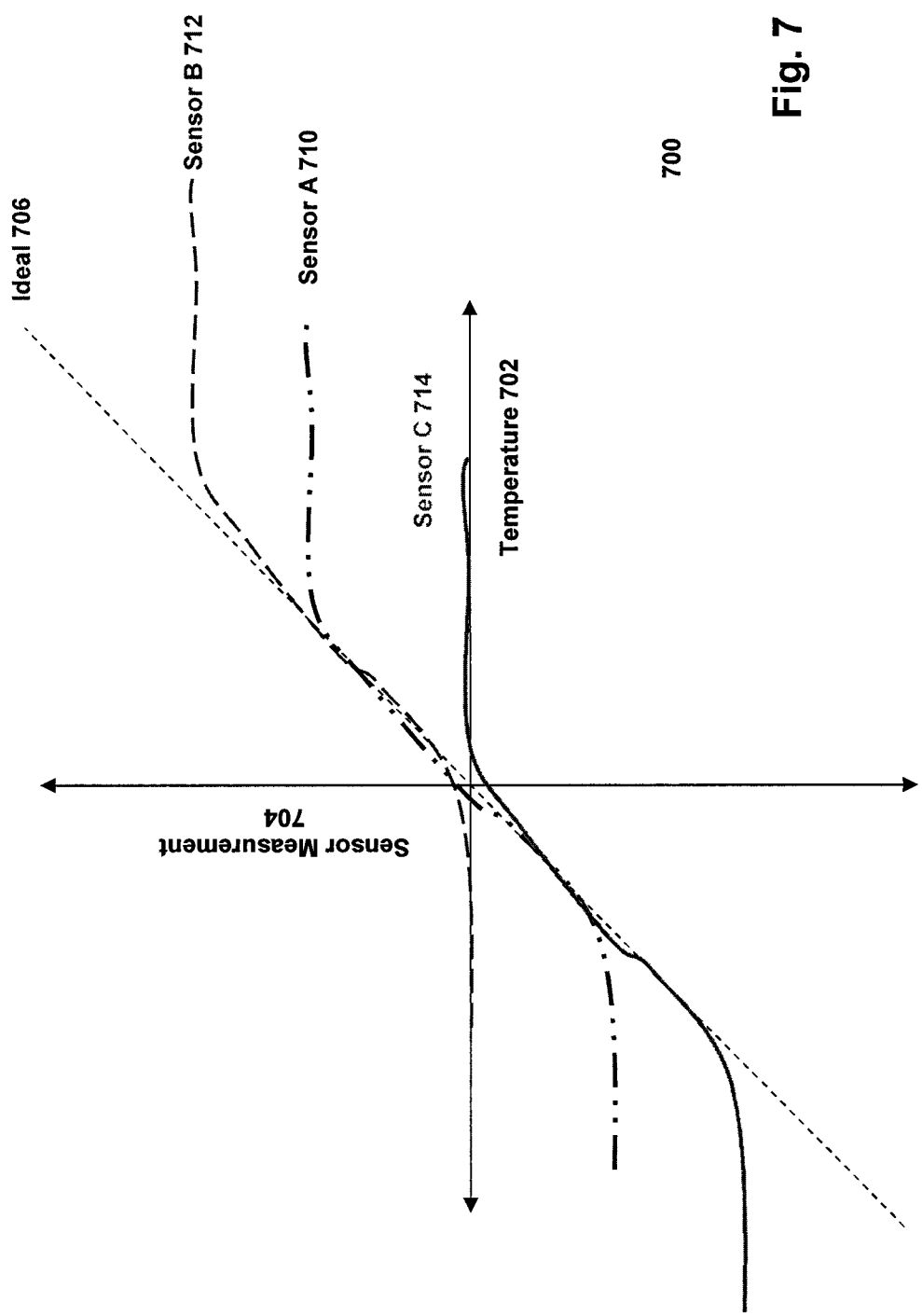

SYSTEM AND METHOD FOR ACTIVATING AN ELECTRONIC DEVICE USING TWO OR MORE SENSORS

FIELD OF DISCLOSURE

The disclosure described herein relates to a system and method for selectively activating electronic elements in an electronic device. In particular, the disclosure described herein relates to activating the device by using two or more sensors to detect an activation condition for the device.

BACKGROUND

Current portable electronic devices perform a variety of functions to enable mobile users to stay current with information and communications, such as e-mail, corporate data and organizer information while they are away from their desks. Such devices may be wireless communication devices, and may be handheld, that is, sized and shaped to be held or carried in a human hand. A wireless connection to a server allows a mobile communication device to receive updates to previously received information and communications. The handheld devices may be lightweight and compact.

BRIEF DESCRIPTION OF THE DRAWINGS

The disclosure will now be described, by way of example only, with reference to the accompanying drawings, in which:

FIG. 6 is a table of detected conditions from multiple sensors being evaluated by the activation system of FIG. 1;

FIG. 7 is a plot showing sensor measurements of exemplary sensors used by the activation system of FIG. 1;

DETAILED DESCRIPTION

Figure 1:
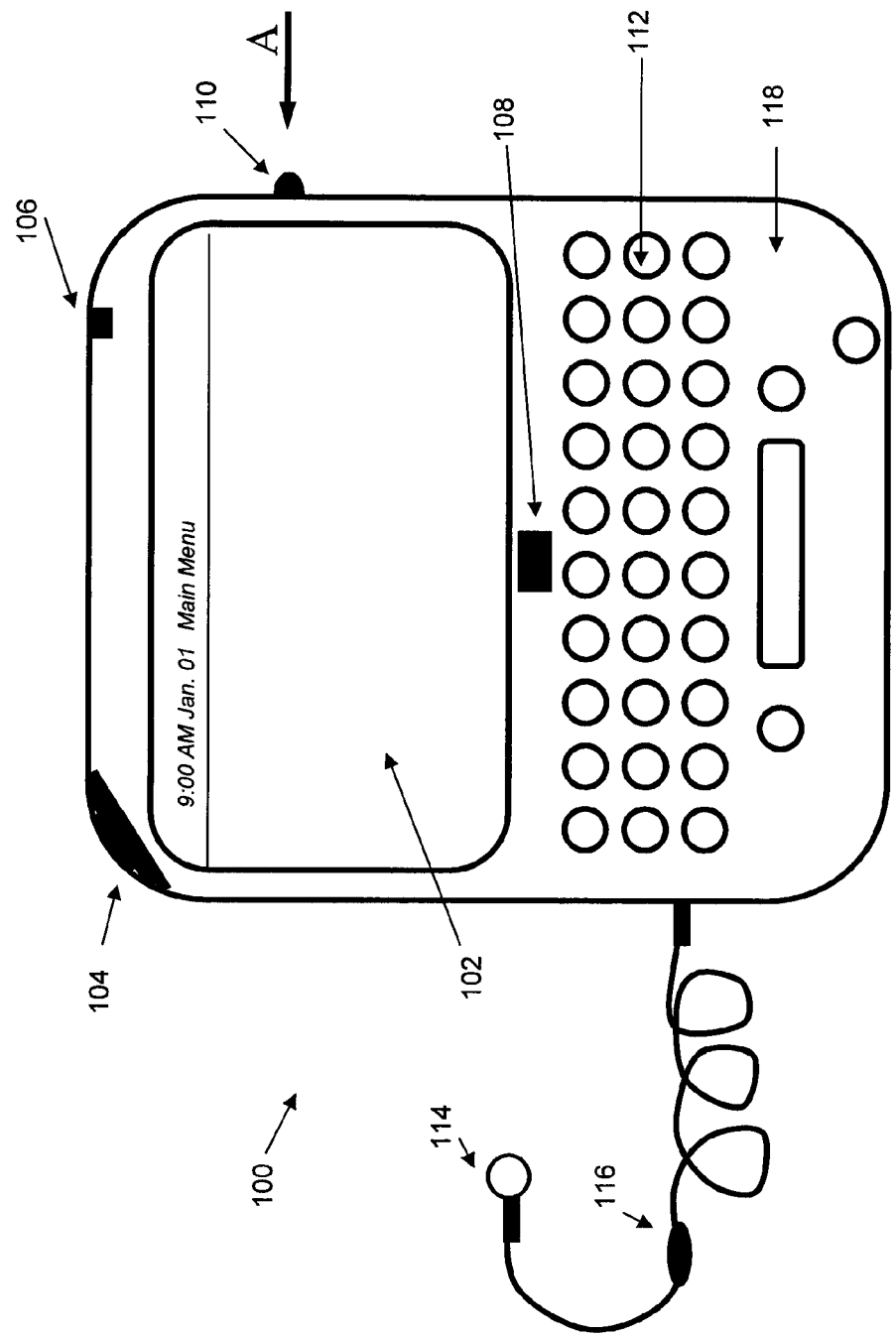
FIG. 1 is a schematic representation of an electronic device having an activation system in accordance with an embodiment.

Portable electronic devices, particularly wireless handheld mobile communication devices, typically include a power supply that supports the device's portability. The power supply has a finite capacity and typically is replenished or recharged from time to time. A typical power supply is a rechargeable battery, but the power supply may include other elements that supply power to the components of the portable electronic device. In order to conserve power, a device may have a low-power or "sleep" mode in which power consumption is reduced. Typical techniques for power conservation may include selectively slowing down the clocking rate of the components or selectively de-activating the components, for example. When a device is in a lower-power mode, the device's power consumption is generally reduced, but the device's functionality is also reduced. Activating (which includes reactivating) the device—that is, taking the device out of "sleep" mode into a higher-power mode, typically enabling more of the device's functionality and/or components—can be accomplished by a positive action by a user on the device, such as pressing an "on" switch on the device. Described below are apparatus, systems, devices, circuits, processes and methods whereby a user can activate the device without having to know what particular switch to activate or what other action may be required to activate the device.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect of an embodiment, an activation circuit for an electronic device is provided. The circuit comprises: a first sensor to monitor for a first condition relating to an environment as affected by a user of the device; a second sensor to monitor for the first condition relating to the environment isolated from effects of the user; and an activation circuit to evaluate signals from the first and second sensors to determine whether to change an activation state of a component on the device. This may involve activating or deactivating the component.

In the circuit, the first sensor may be located on the device in a first location where the user is expected to handle the device.

In the circuit, the second sensor may be located on the device in a second location where the user is not expected to handle the device.

In the circuit, the first and second sensors may detect heat.

The circuit may evaluate the signals from the first and second sensors in view of a selection of temperature ranges for the device.

The circuit may further comprise: a third sensor to monitor for a second condition relating to the environment as affected by a user of the device; and a fourth sensor to monitor for the second condition relating to the environment isolated from effects of the user. The activation circuit may analyze signals among the first, second, third and fourth sensors to determine whether to activate/deactivate the component.

The activation circuit may compare signals from the first and second sensors and may compare signals from the third and fourth sensors to determine whether to activate/deactivate the component.

The activation circuit may compare signals from the third and second sensors and may compare signals from the first and fourth sensors to determine whether to activate/deactivate the component.

The activation circuit may evaluate sequentially a first set of signals from the first and second sensors and then a second set of signals from the third and fourth sensors to determine whether to activate/deactivate the component.

The activation circuit may evaluate a first set of signals from the first and second sensors and then may evaluate a second set of signals from the third and fourth sensors to determine whether to activate/deactivate the component.

The activation circuit may evaluate a first set of signals from the first and second sensors with a second set of signals from the third and fourth sensors to determine whether to activate/deactivate the component.

In the circuit, the first and second conditions may be related to heat detected by the first, second, third and fourth sensors.

The activation circuit may further comprise a fifth sensor to monitor for a third condition relating to the environment isolated from effects of the user. The activation circuit may compare signals from the third and second sensors and may further utilize signals from the fifth sensor to determine whether to activate/deactivate the component.

In the circuit, an output of the activation circuit may be connected to an interrupt input line of a processor in the device.

The activation circuit may utilize data from either or both of the second and fourth sensors as baseline condition(s) for the environment to determine whether to activate/deactivate the component.

In the circuit, the first sensor may detect heat and the second sensor may detect another condition.

In a second aspect, a method for activating a component in an electronic device is provided. The method comprises: monitoring for a first condition by the device, the first condition relating to an environment as affected by a user of the device; monitoring for a second condition relating to the environment relating to the first condition, but isolated from effects of the user; and determining whether to change an activation state of the component on the device after evaluating at least signals from the first and second sensors. The change may involve activating or deactivating the component.

In the method, monitoring for the first condition may be conducted at a first location on the device where the user is expected to handle the device.

In the method, monitoring for the second condition may be conducted at a second location where the user is not expected to handle the device.

In the method, the first and second conditions may be related to heat.

In the method, determining whether to activate the component may evaluate data from the first and second conditions in view of a selection of temperature ranges for the device.

The method may further comprise: monitoring for a third condition relating to the environment as affected by a user of the device; and monitoring for a fourth condition relating to the environment relating to the third condition, but isolated from effects of the user. The method may analyze the first, second, third and fourth conditions to determine whether to activate/deactivate the component.

The method may compare data from the first and second conditions and may compare data from the third and fourth conditions to determine whether to activate/deactivate the component. These comparisons may be done sequentially or together.

The method may compare data from the third and second conditions and may compare data from the first and fourth conditions to determine whether to activate/deactivate the component.

In the method, the first, second, third and fourth conditions may be related to heat.

The method may further comprise monitoring for a fifth condition relating to the environment isolated from effects of the user. The method may compare data from the third and fourth conditions and may further utilize data from the fifth condition to determine whether to activate/deactivate the component.

The method may be embodied in an interrupt routine operating on a processor to activate an interrupt line on the processor in the device.

In other aspects various combinations of sets and subsets of the above aspects are provided.

Generally, an embodiment provides a device, system and method to change an activation state of a device, component, system, module or other element (either within the device or for another device) using signals from two or more sensors. One embodiment provides an activation system to activate an electronic device, such as, but not limited to, a (portable) wireless communication device, a laptop computer or a personal computer. The change in state may be to activate or deactivate the component. The component may be controlled by a processor in the device or may be controlled by an activation controller.

Multiple components may be controlled. An embodiment utilizes multiple sensors (namely at least two sensors) to detect changes in environment and/or operating conditions for the device. The environment detected may be related to any ambient condition surrounding the device (e.g. ambient temperature, light, sound, etc.). The signals generated by the sensors are processed by an embodiment to make a determination as to whether the device is being used or not. One or more sensors may be used to provide a "baseline" measurement of conditions around a device. These sensor(s) detect conditions relating to an environment for the device that is isolated from effects of a user of the device. Other sensor(s) provide measurements relating to when the device is being activated (e.g. it is being picked up). These sensor(s) detect conditions relating to an environment for the device as currently affected by a user of the device. For example, these sensor(s) may detect heat around an area on the device where a user is expected to hold the device. Detection of the presence or absence of a user's heat signature (e.g. from his hand) may indicate whether the device is to be activated (or not).

Another embodiment may provide a device, system and method to deactivate (or not) a device, component, system, module or other element (either within the device or for another device) using signals from two or more sensors.

Both sensors may detect the presence or absence of any number of physical conditions, e.g., infrared conditions, heat (temperature), light, sounds, movement, acceleration, orientation, humidity, force, stress, pressure, magnetic fields, voltage, current, x-rays, gamma rays, etc. "Conditions" may also include changes in any of these factors, or differences in comparison of one to another, e.g., change in orientation, variation in magnetic fields, differential stress, difference in heat, and so on. It will be clear on the context how the term condition is being used in the specification. Two or more sensors may be of the same type, detecting the same condition. The sensors may be calibrated or designed to detect different parameters or ranges for the condition. The sensors may have different sensitivities for the same operating range. Alternatively, they may detect different conditions. In certain circumstances, data from different types of sensors may be evaluated together to determine a condition. For example an embodiment may use a heat and a light sensor, where data from the two sensors are collectively used to determine whether the device is to be activated.

First, some detail is provided on a device that incorporates an activation system according to an embodiment, followed by some exemplary algorithms used by activation systems according to various embodiments.

Detail is now provided on selected components of a device that are related to processes relating to an embodiment. Referring to FIG. 1, electronic device 100 is based on a computing platform having functionality of an enhanced personal digital assistant with cellphone and e-mail features. It is, however, to be understood that electronic device 100 can be based on construction design and functionality of other electronic devices, such as smart telephones, desktop computers, pagers or laptops having telephony equipment. In a present embodiment, electronic device 100 includes a display such as a liquid crystal display (LCD) 102, speaker 104, LED indicator 106, input device 108 (which may be a key, touchpad, trackpad, trackball, light sensor or any other input device), ESC ("escape") key 110, keypad 112, a telephone headset comprised of an ear bud 114 and a microphone 116. ESC key 110 can be inwardly depressed as a means to provide additional input to device 100. ESC key 110 may be depressed along the path of arrow "A". A trackball may be provided (not shown).

Housing 118 encloses internal components of device 100. Housing 118 can be made from any material that may be formed to house and hold all components of device 100.

An alternative embodiment of device 100 (not shown) may incorporate a minimized set of external keys. As such, LCD 102 may present a virtual keypad on its display, which replaces or supplements one or more of keypad 112, key 112 or other keys.

Device 100 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system, Time Division Multiple Access (TDMA) system, 3G and 4G systems, etc. Other wireless phone systems can include Bluetooth (trade-mark) and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 114 can be used to listen to phone calls and other sound messages and microphone 116 can be used to speak into and input sound messages to device 100.

Figure 2:
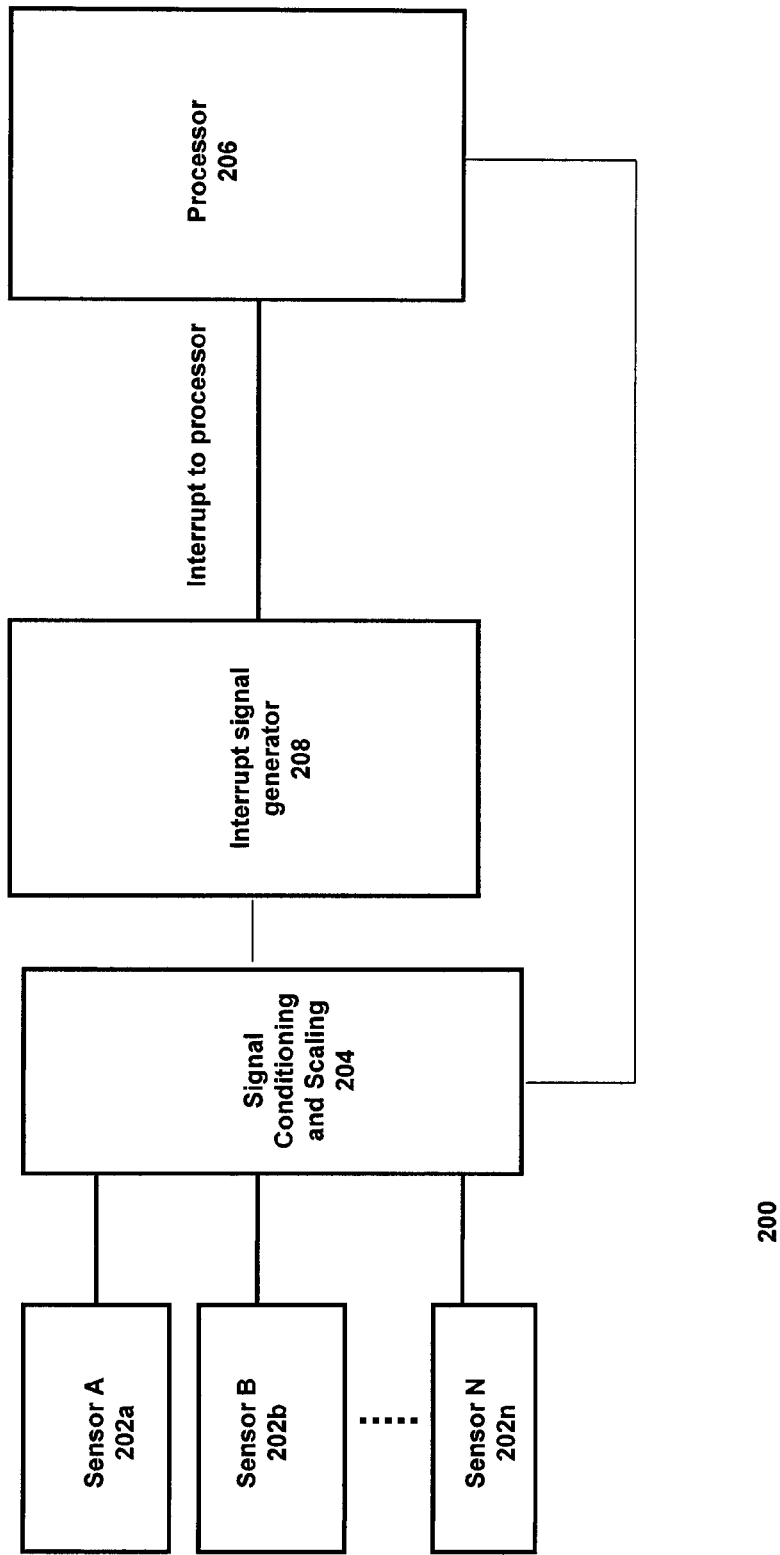
FIG. 2 is a block diagram of certain internal components and the activation system in the device in FIG. 1.

Referring to FIG. 2, some components of an activation system provided in device 100 according to an embodiment are shown. Device 100 has power management features that allow it to selectively change an activation state (i.e. activate or deactivate) of one or more of its components based on conditions detected and derived by device 100. For example, after a period of non-activity, device 100 may turn off its display (and other functions). Subsequently, upon detection of an activation condition, the display (and/or other functions) may be re-activated. In another example, a user may actively put the device into sleep mode. For the purpose of the disclosure, the concepts described herein may be applied to activate a sleeping device (that is, to discontinue a lower-power mode and begin a higher-power mode) without regard to how the device entered sleep mode.

Activation system 200 controls how and when certain components in device 100 are activated. System 200 includes sensors 202, signal conditioning and scaling module 204 and processor 206. Although shown for clarity as separate components, some of the elements of activation system 200 may be (but need not be) embodied within one or more unified physical structures. Processor 206 may be a multi-function microprocessor. Signals generated by sensors 202 are supplied to signal conditioning and scaling module 204. Sensors 202 may be any apparatus that generates a signal in response to a condition, such as an infrared sensor, a visible light sensor, a microphone or other sound sensor, an accelerometer, a humidity sensor, a force sensor, a pressure sensor, a magnetic field sensor, etc. Module 204 may generate an activation signal in response to one or more signals from sensors 202, which may be supplied to processor 206 directly or (as depicted in FIG. 2) through an interrupt generator 208. The sensors 202 may detect one or more of the conditions noted earlier. Generally, upon detection of a condition (e.g., movement of the device) or a level of a condition (e.g. amount of heat), sensors 202 generate electrical signals that are related (e.g. proportional) to the strength of the condition detected. Module 204 filters and scales its received signals, allowing signals from different sensors 202 to be compared on an equivalent numeric basis. For example, sensor 202a (not shown) may be a movement sensor that generates signals between approximately −1 and +1 volt; sensor 202b (not shown) may be a light sensor and may generate signals between approximately 0 and 3 volts (or other ranges) for a certain range of detected light; and sensor 202c (not shown) may also be a light sensor of a different kind that may generate signals between 0 and 5 volts (or other ranges) for the same range of detected light. These different ranges can be normalized by module 204 so that (for example) signals from different sensors can be compared. Module 204 may also filter extraneous or meaningless signals (e.g. signals that are too small, too large, too infrequent, etc.). In the embodiment of FIG. 2, processor 206 is the main control component of device 100. Processor 206 may execute instructions (e.g., stored in a memory element, not shown in FIG. 2) that regulate, monitor or control a variety of the functions for device 100. Once an activation signal is generated by signal conditioning and scaling module 204, processor 206 may activate a component in device 100, that is, processor 206 may put a component that had been in a lower-power state into a higher-power state. Processing of the signals from sensors 202, or from signal conditioning and scaling module 204, or from interrupt generator 208 may be conducted in the analog domain, the digital domain or a hybrid analog/digital domain.

In an alternate embodiment, signals generated by sensors 202 may be supplied directly to processor 206. In the embodiment depicted in FIG. 2, however, information is passed to module 204, then to interrupt generator 208. Signals from interrupt generator 208 may be supplied to an interrupt line of processor 206. This allows signals from generator 208 (and ultimately from sensors 202) to provide "real time" input values that an interrupt process operating on processor 206 can use to determine what the signals from sensors 202 mean and what actions, if any, to take in view the signals.

As noted, an embodiment uses two or more sensors to detect operating conditions for a device. This provides certain advantages for an embodiment. First, using two or more sensors may assist with reducing the number of keys provided on device 100, which may allow for a thinner profile for device 100. Also, using two or more sensors allows for more condition readings to be made at different locations on device 100. A sensor may be tailored to monitor for specific conditions, based on its location on device 100. Using two or more sensors allows for statistical analysis to be conducted for the data generated by the sensors to eliminate spurious data. An embodiment provides improved power savings for device 100 from a robust activation of sleep mode. Using strategically placed multiple sensors provides an activation system having higher accuracy of data relating to conditions surrounding device 100. This provides improved data analysis which may assist in preventing false activations of device 100. An embodiment provides flexible industrial designs for device 100, as certain buttons may be eliminated, such as an activation button. Moreover, some of the sensors 202 are compact or may be present on the device for purposes other than activation; consequently, the concepts described herein can be implemented with little effect on size or weight. An embodiment also provides wider dynamic range for measurement sensors, as multiple sensors having different operating ranges may be used together to evaluate operating conditions over a wider range than a single sensor. An embodiment also facilitates providing activation/deactivation control signals for devices that have a minimal number of physical input keys, e.g. where a device used a touch screen to replace a typical physical keypad.

Figure 3:
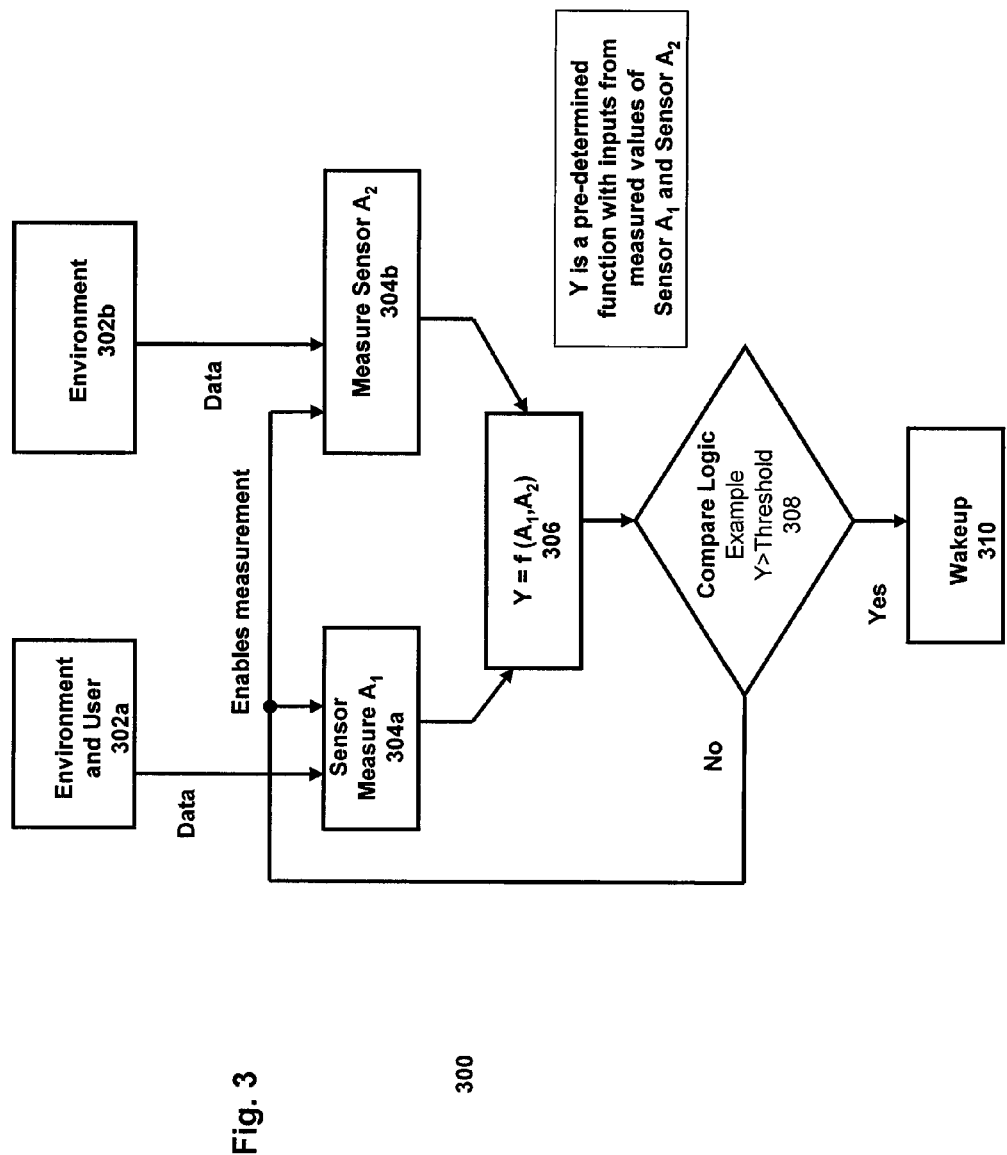
FIG. 3 is a flow chart of processes executed by the activation system of FIG. 1 having two sensors.
Figure 4:
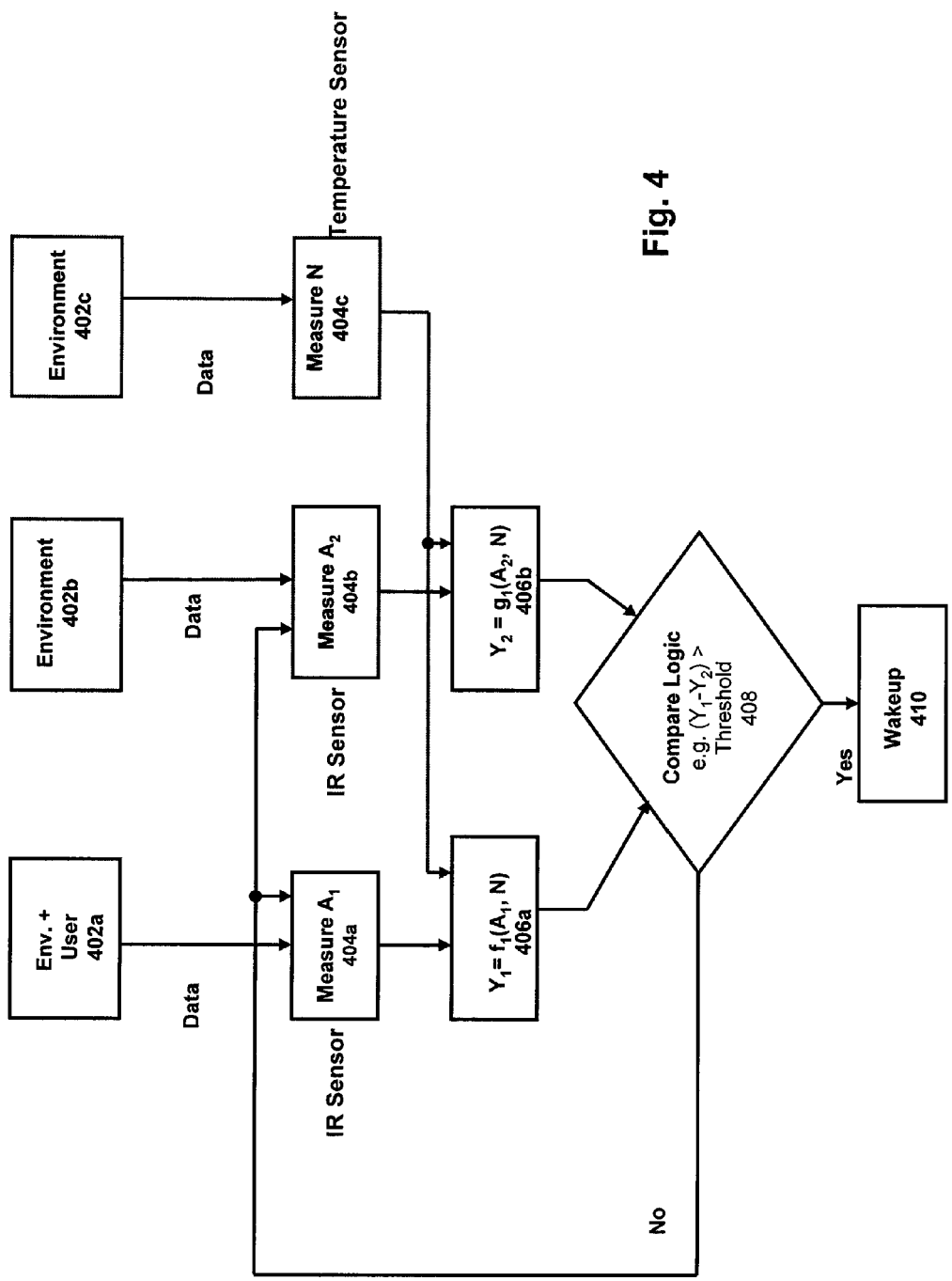
FIG. 4 is a flow chart of processes executed by the activation system of FIG. 1 having two infrared (IR) sensors and a temperature sensor.
Figure 5:
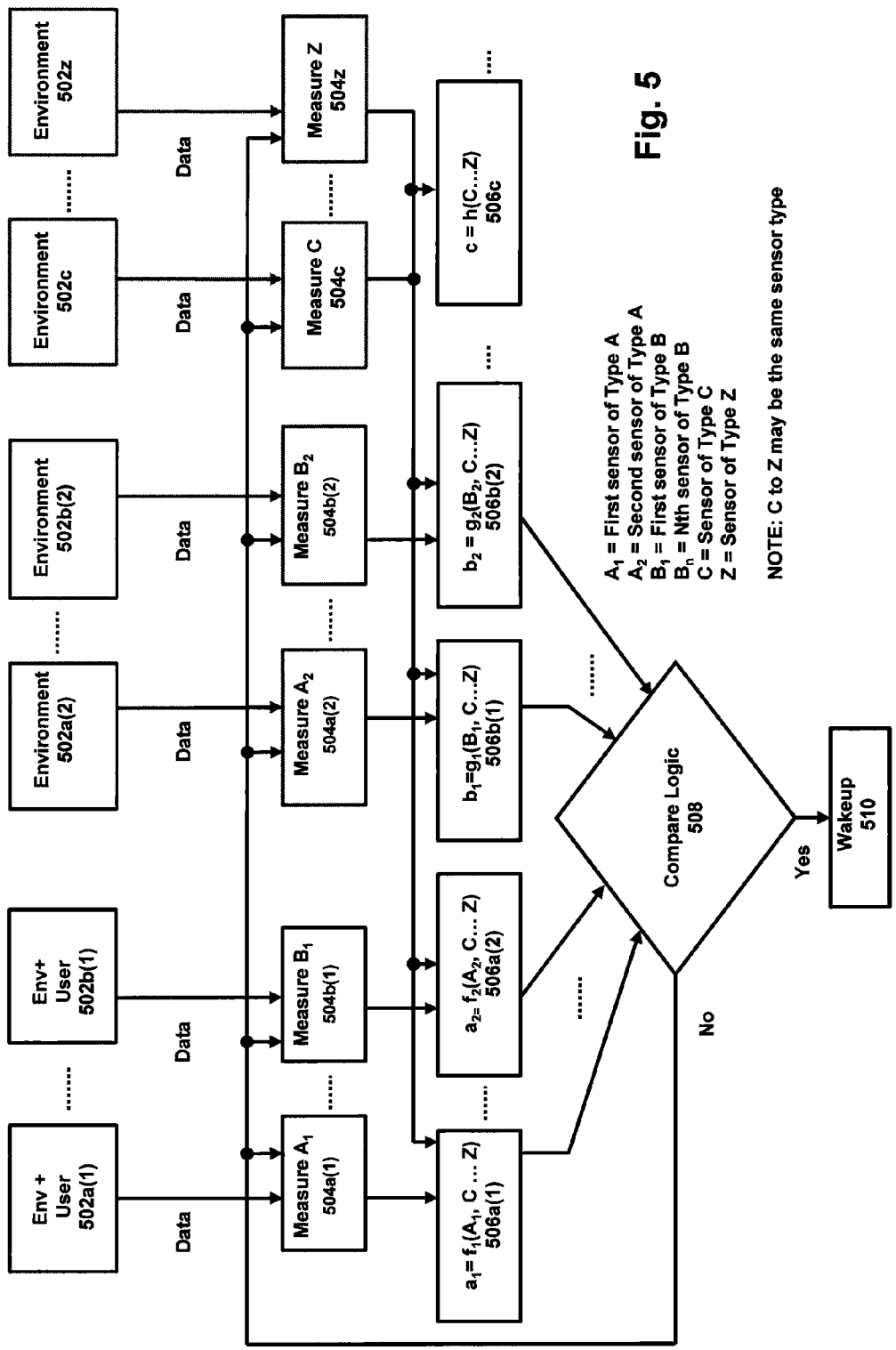
FIG. 5 is a flow chart of processes executed by the activation system of FIG. 1 having multiple sensors.

With some components of an embodiment identified, further detail on the interrupt process and other applications are provided in FIGS. 3 to 5.

Referring to FIG. 3, process 300 shows an algorithm of an embodiment in which there are two sensors. Boxes 302a and 302b represent current detected conditions relating to a device, such as device 100. Box 302a represents a sensor A1 for a condition where the presence of a user of device 100 can be detected. For example, the sensor may be a heat sensor that is located near the keyboard or at a location where a user is expected to handle or pick up device 100. (Sites that a user may be expected to handle may depend upon the portable electronic device. Such sites may include user interface sites, such as keys, buttons, touch screens, touch pads, and the like. Such sites may also include specific structures sized or shaped to be moved or held by a human hand, such as a handle, a flip-phone cover, or the sides of a smart phone which when held position the smart phone to be held up to the head and to be used as a phone. Such sites may further include structures that may provide mechanical advantage or ease of manipulation; e.g., it may be mechanically easier to pick up a candy-bar-shaped device by gripping it on the sides than by seizing it on a single corner. In that configuration, when a key on device 100 is activated, the sensor may be tuned to detect the heat from the user's finger as it is placed on or near the key (or the heat as the user handles the device). Box 302b represents a sensor A2 for a condition detected by device 100 that can be isolated from activities of the user. For example, the sensor may be a heat sensor that is located away from any area where a user may handle device 100, such as at a backside of device 100 or on a side of device 100. Alternatively, an environment sensor (that is, a sensor that detects conditions relating to the ambient environment and that does not substantially respond to activity or interaction by a user) may be located near a sensor that detects conditions relating to both an environment and a user, herein referred to an "environment+user" sensor or an "environment and user" sensor. An environment+user sensor in one embodiment detects conditions relating to the ambient environment and that does substantially detects conditions relating to activities (e.g. motion), conditions (e.g. body heat), or interactions (e.g. voices) from a user) if the environment sensor can be shielded from the effects of the user's influence. As such, even when user is using or holding device 100, the sensor may be isolated from such effects of the user. This configuration for the sensor provides a baseline measurement of its condition and the related ambient condition. This baseline measurement may be compared against conditions detected by other sensors. An example may illustrate the idea. If an environment+user heat sensor and an environment heat sensor both detect an increase in heat, the increase in heat could be due to a change in the heat of the environment, rather than user activity. If, however, the environment+user heat sensor detects an increase in heat but the environment heat sensor does not, then user activity is indicated. The device may remain asleep in the former case, and be activated in the latter. This example will be discussed in more detail below.

Signals from each sensor are supplied to processes 304a and 304b, in which the signals are measured. Measuring may include any technique for quantifying the signal, such as determining a magnitude or a direction or a change or any combination thereof Measuring may be done by signal conditioning and scaling module 204, for example, or by the sensors 202 themselves. These measuring processes may operate independently of each other or may operate in concert. Sensors may supply signals on a periodic basis, continually or upon certain trigger conditions (e.g. detected movement, change in status of the device, etc.). Data from the sensors is accessed by an analysis algorithm for processing, noted by process 306. In process 306, the function $$Y=F(A_1, A_2) \qquad \text{Equation 1}$$

can provide any scaling, offsets, weighting and conditions to evaluate the data generated from the sensors. In certain conditions, the data from one sensor may be emphasized over the other and vice versa. This analysis may be performed by signal conditioning and scaling module 204, for example, or by the sensors 202.

At process 308, the resulting output of Equation 1 is compared against an activation threshold. If the threshold is surpassed, then the signal conditioning and scaling module 204 can generate an activation signal that can be used to activate one or more modules on device 100—colloquially called waking up—per process 310. Two or more thresholds may be established, indicating different events. Different conditions may be implemented to determine when to apply a particular threshold. If the threshold is not met, then another sample of data may be taken, by returning to processes 304a and 304b. Alternatively data may be read continuously or upon the occurrence of circumstances (e.g. taken at scheduled time intervals).

For example, sensor A1 may a temperature sensor be placed near a keypad of device 100 and temperature sensor A2 may be placed on the top edge of device 100. In an environment where device 100 has not been used for an amount of time and is resting on a table, the display of device 100 may be turned off. At that time, temperature readings generated by sensors A1 and A2 would be nominally identical. When a user of device 100 approaches device 100 with the intent of activating it, he may tap a key on the keypad or may pick up device 100. At that time, sensor A1 will detect an increase in temperature as it detects the user's hand/finger at the key or the sensor location. This change in the temperature condition from sensor A1 is provided to process 304a. At that same time, sensor A2 does not detect a significant increase in temperature as it is more isolated from the user's hand/finger at the key. This non-change in the temperature condition from sensor A2 is provided to process 304b. Process 306 evaluates the readings and at process 308, depending on whether an activation threshold is passed, an activation signal may be provided for the display at process 310 or a further reading may be taken at processes 304. The threshold may not be passed if the user did not touch the key long enough or if he merely approached the key, but did not activate it.

An embodiment can adjust sensitivities for readings for one or both of the sensors for given expected conditions. The above noted example is based on a user handling device 100 in a room temperature condition. However, different conditions may affect the reading provided, yet an embodiment may still provide an activation analysis. For example, different sensitivities may be provided to consider situations where: (a) the user is wearing a glove (thereby providing a lower temperature reading as he approaches sensor A1); (b) the device is stored on the user, but is not being used (thereby providing a higher ambient temperature reading for sensors A1 and A2); (c) the device is being used outside on a hot/cold/humid/rainy etc. day; (d) the device is being used in daylight/darkness etc.; (e)or other situations where ambient conditions may vary from a room temperature environment and/or where a user's input may be affected by a given condition.

Referring to FIG. 4, process 400 shows an algorithm of an embodiment where three sensors are provided. Box 402a represents a sensor for a condition where the presence of a user of device 100 can be detected in an environment. Boxes 402b and 402c represent sensors for different conditions of device 100 that can be isolated from activities of the user. For example, measurement 402b may be related to an infrared (IR) sensor and measurement 402c may be related to a temperature sensor that are both located on device 100 at places where the user will not be expected to generally contact.

At processes 404a, 404b and 404c data from each sensor is generated and stored and/or processed. These processes may operate independently of each other or may operate in concert. The measurements may be done on a period basis, continually or upon certain trigger conditions (e.g. detected movement, change in status of the device, etc.). Data from the sensors is accessed by an analysis algorithm for processing, noted by process 406a and 406b. In processes 406a, the function $$Y_1 = f(A_1, N) \qquad \text{Equation 2}$$

evaluates the environment+user sensor reading with the temperature. In processes 406b, the function $$Y_2 = g(A_2, N) \qquad \text{Equation 3}$$

evaluates the IR data reading with the temperature reading. As such each process evaluates two sensor readings together. Other combinations of sensor evaluations may be conducted. For both functions, any scaling, offsets, weighting and conditions to evaluate the data generated by the sensors.

At process 408, the outputs of Equations 2 and 3 are combined and compared against an activation threshold. If the threshold is surpassed, then the activation system can generate an activation signal that can be used to (re) activate one or more modules on device 100 (or even device 100 itself) per process 410. If the threshold is not met, then another sample of data may be taken, by returning to processes 404a and 404b. Alternatively data may be read continuously or upon certain circumstances (e.g. taken at scheduled time intervals).

Referring to FIG. 5, process 500 shows an algorithm of an embodiment where multiple environment+user sensors and multiple condition sensors are provided. In one embodiment, paired sets of sensors are used.

For an exemplary implementation, "A" sensors are one type of sensor (e.g. heat). Two "A" sensors are used: sensor A1 as provided in box 502a(1) is used to detect temperature conditions for the environment and the user; and sensor A2 as provided in box 502a(2) is used to detect conditions for the environment. Up to N "A" sensors may be used. Each of the "A" sensors may be the same or may have different sensitivities and ranges of operation. Each "A" sensor may be located at strategic locations in device 100, depending on its targeted condition. For example, sensor A1 may be located to detect heat where a user is expected to touch or hold device 100. This may be around its keyboard, on its back of its housing or near its touchpad, etc. Sensor A2 may be located to detect heat where a user is not expected to touch or hold device 100. This may be around its top, its side, its corners, etc. (As with sites that a user may be expected to handle, sites that a user may be expected not to handle may depend upon the portable electronic device. Such sites may include sites that are comparatively remote from user interface sites. Such sites may also include specific structures sized or shaped to be more difficult to grasp, for example, it may be more difficult to grasp a smart phone by the ends than by the sides, and a smart phone grasped in such a way would not be as functional if it were to be held up to the head be used as a phone. Such sites may further include structures that may provide less mechanical advantage or ease of manipulation; e.g., the corners of the device.) As such, reading from sensors A1 and A2 may be compared against each other to determine a condition of an environment of device 100 and a condition where the user is affecting the environment. This enables additional precision to be provided as an embodiment can consider how a user's presence affects an environment of the device.

In an embodiment, "B" sensors are another type of sensor (e.g. photodetector), but they may be the same type as sensors "A". Two "B" sensors are used. Sensor B1 as provided in box 502b(1) is used to detect light conditions for the environment and the user. Sensor B2 as provided in box 502b(2) is used to detect light conditions for the environment. Up to M "B" sensors may be used. Each of the "B" sensors may be the same or may have different sensitivities and ranges of operation. Each "B" sensor may be located at strategic locations in device 100, depending on its targeted condition. For example, sensor B1 may be located to detect light where a user is expected to touch or hold device 100. This may be around its keyboard, on its back of its housing or near its touchpad, etc. An absence of light may indicate that the user is covering sensor B1. Sensor B2 may be located to detect light where a user is not expected to touch or hold device 100. This may be around its top, its side, etc. As such, reading from sensors B1 and B2 may be compared against each other to determine a condition relating to an environment and the effect of the user on that environment for device 100.

In some conditions readings from an "A" sensor may be compared with a reading from a "B" sensor. Further, additional sets of sensors may be used to measure each of an environment +user conditions and environment conditions.

Sensors C . . . Z as provided in boxes 502c . . . 502z are additional sensors. The sensors may be the same or different than sensors A or B. other sensors. Sensors C-Z measure conditions relating to an (ambient) environment of device 100 and do not have a corresponding sensor to environment+user conditions. Each sensor C-Z may be located at strategic locations in device 100, depending on its targeted condition. As such, reading from sensors C . . . Z may not need to be compared against each other to determine a condition. However, it is possible that readings from sensors C . . . Z may be compared against reading from other sensors (A, B, and C . . . Z) to determine a condition. It is also possible that readings from sensors C . . . Z may be used to provide a necessary condition for activating device 100.

An embodiment can adjust sensitivities for readings for one or both of the sensors A1, A2, B1, B2, C, . . . Z , etc. As noted earlier, different sensitivities may be implemented to consider situations where the user is wearing a glove or where the device is stored on the user, but is not being used or other situations.

At processes 504a(1) and (2), 504b(1) and (2), and 504c . . . 504z data from each sensor is measured. These processes may operate independently of each other or may operate in concert. The measurements may be done on a period basis, continually or upon certain trigger conditions (e.g. detected movement, change in status of the device, etc.). Data from the sensors accessed by an analysis algorithm for processing, noted by process 506a(1) and (2), 506b(1) and (2) and 506c.

In processes 506a(1) and (2), the functions $$a_1 = f_1(A_1, C \ldots Z) \qquad \text{Equation 4}$$

$$a_2 = f_2(A_2, C \ldots Z) \qquad \text{Equation 5}$$

evaluate the temperatures of environment and user conditions (alone and combined).

In processes 506b(1) and (2), the functions $$b_1 = g_1(B_1, C \ldots Z) \qquad \text{Equation 6}$$

$$b_2 = g_2(B_2, C \ldots Z) \qquad \text{Equation 7}$$

evaluates the detected light of environment and user conditions (alone and combined).

Use of multiple sets of environment+user sensors provides improved precision and monitoring of activation conditions by an embodiment. Data from sensors A and B may be averaged and weighted according to the sensitivities and locations of the sensors. Also, an embodiment may utilize "environment+user" data from one type of sensor (e.g. sensor 502a(1)) and compare it against data from another type of sensor (e.g. sensor 502b(2)).

An embodiment can adjust sensitivities for readings for one or both of the sensors A1, A2, B1, B2, C, . . . Z, etc. As noted earlier, different sensitivities may be established to consider situations where the user is wearing a glove or where the device is stored on the user, but is not being used or other situations.

In processes 506c, the function $$c = h(C \ldots Z) \qquad \text{Equation 8}$$

evaluates the environment conditions detected by sensors C-Z.

At process 508, the resulting outputs of Equations 5-8 are combined and compared against an activation threshold. If the threshold is surpassed, then the activation system can generate an activation signal that can be used to activate and/or re-activate one or more modules on device 100 (or even device 100 itself) per process 510. If the threshold is not met, then another sample of data may be taken, by returning to processes 504. Alternatively data may be read continuously or upon certain circumstances (e.g. taken at scheduled time intervals).

FIG. 6 shows chart 600 showing a matrix of detected conditions by sensors A1, A2 and a temperature sensor and various conditions that will trigger and will not trigger a wakeup condition. In chart 600, column 602 lists a series of twelve exemplary (illustrative) situations monitored by the activation system of device 100. Each row in chart 600 represents a series of readings from the sensors, a value for an algorithm processing the readings and a determination as to whether or not one or more components on device 100 should be "awakened". For each row in chart 600, column 604 provides a text label for the situation tracked by the row. Several environments may be considered for device 100, including "normal" temperature environments (e.g., around typical room temperature), cold environments (e.g., less and much less than room temperature), and hot environments (e.g., above and much above room temperature). As such, an embodiment can provide different activation parameters for different operating environments. Such environments may be based on any one or more of the current level of heat, humidity, light, the current time, day, location, etc. A set of conditions may be established to deactivate one or more components on device 100.

For each situation, entries in columns 606 provide matrix entries for an activation scheme using sensors A1 and A2. Therein, specific columns identify whether the condition represents a "positive activation condition" (yes/no), which indicates whether this condition in general represents an apparently purposeful action taken by a user, a set of readings from sensors A1 and A2, a calculation of the absolute difference between the readings and an indication as to whether or not the difference passed a threshold to wakeup device 100 (yes/no). Also, for each situation, entries in columns 608 are located beside columns 606 provide matrix entries for a wakeup scheme using sensors A1, A2 and B, where B is shown as a temperature sensor. As such, sensor values in column 606 are selectively adjusted for temperature effects. Specific columns in columns 608 identify whether there has been any user intervention (yes/no), a set of readings from sensors A1, A2 and temperature, calculations of temperature adjustments for sensors A1 and A2 and an indication as to whether or not the difference passed a threshold to wakeup device 100 (yes/no).

It can be seen that for chart 600, values in entries 606a and 606b show a reading for sensors A1 and A2 as "55" and "51", which provides a difference score of "4" and which, for the threshold established, indicates that there is no activation condition. Meanwhile, for column 608a, when temperature is considered, the analysis changes. Values in entries 608a and 606b show readings for sensors A1 and A2 as "55" and "51", but with the temperature adjustments, the values are modified to "55" and "49". This temperature adjusted value now provides a difference score of "6" and which, for the threshold established, indicates that there is a positive activation condition. Other differences can be seen between values in a given row in columns 606 compared with a corresponding row in columns 608. Different thresholds may cause different trigger conditions to be satisfied or not, depending on the thresholds. Variations on the chart may be provided to identify different/additional activation conditions. A series of conditions may be linked together (in series or in parallel) to identify an ultimate activation condition, thereby providing staged analysis of a series of sub-conditions that collectively provide an activation condition. The conditions may be combined, averaged and weighted and compared against different thresholds to make a final activation determination.

It will be appreciated that any aspect of any of the flow charts of FIGS. 3-5 may be converted to a state diagram, where a progression of states are used to monitoring and evaluate conditions detected by sensors 202 in device 100. Therein, an initial state is entered when device 100 enters a lower-power state. The system may then immediately transfers to a waiting state, which monitors for signals from one or more sensors 202. Once a number of signals from one or more of sensors 202 are received, then the system moves to an evaluation state, where the signals are evaluated to whether an activation condition has been met, (subject to any thresholds). If all thresholds are passed, the system moves to an activation state, where selected components on device 100 are activated. A comparable state diagram may be provided to selectively deactivate selected components on device 100.

It will be appreciated that an embodiment may be utilized to selectively de-activate one or more components on device 100 based on condition detected by its sensors. Algorithms and processes as described for FIGS. 3-5 may be used to evaluate environment and operating conditions to identify one or more components to deactivate on device 100. Therein, a deactivation threshold may be used. Activation and deactivation algorithms may operate simultaneously. In certain circumstances, a set of conditions may be used to activate a set of components and deactivate another set of components.

In an embodiment, any of the above noted flow charts for FIGS. 3-5 may be implemented in a circuit, PLDs, PLAs, software, firmware or other systems known in the art. Further, other types of trigger circuits employing more or less input signals, as required, may be provided in other embodiments. Also, in other embodiments different condition signals may be used from one or more different devices in evaluating whether to generate an activation signal.

It has been noted that different sensors for a certain condition (e.g. heat) may provide different operating characteristics. FIG. 7 shows an exemplary plot 700 of operating parameters of different sensors that measure temperature. The x-axis 702 plots temperature values and the y-axis 704 plots a measurement generated by a sensor. In an ideal sensor, the measured value is linear, as per line 706, which has an upward slope. However, real sensors may not provide linear data points and may provide effectively accurate readings only in a certain temperature range. Sensor A shown at plot 708 effectively generates a linear data above and below "0" but then flattens to similar absolute values beyond those temperature ranges. Sensor B shown at plot 710 effectively generates linear data above "0" but then flattens to a value above the maximum value of Sensor A. Sensor C shown at plot 712 effectively generates linear readings from a point below the minimum value for sensor A up to "0" but then flattens to a value. With these different operating characteristics, an embodiment can use the sensors and provide algorithms that provide more precise determination of wakeup conditions over a wider range of conditions based on the reading provided by the sensors and the ambient conditions of device 100. Such adjustments can be incorporated into algorithms described for FIGS. 4-6.

Figure 8:
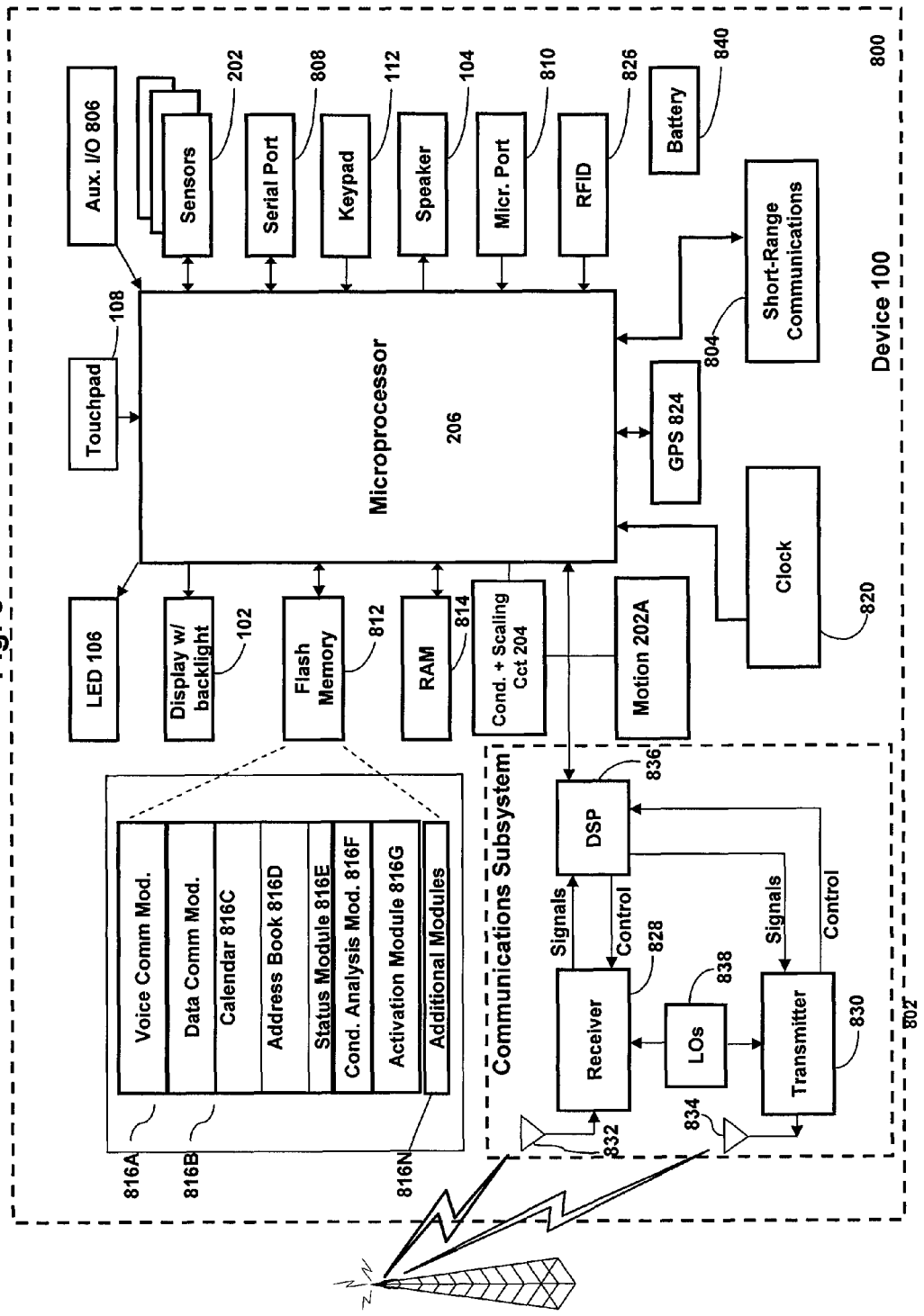
FIG. 8 is a block diagram of certain internal components of the device in FIG. 1.

Now, further detail is provided on components of device 100. Referring to FIG. 8, functional components of device 100 are provided in schematic 800. The functional components are generally electronic, structural or electro-mechanical devices. In particular, processor 206 is provided to control and receive almost all data, transmissions, inputs and outputs related to device 100. Processor 206 is shown schematically as coupled to keypad 112 and other internal devices. Processor 206 may control the overall operation of the device 100 and its components. Exemplary microprocessors for processor 206 include microprocessors in the Data 950 (trademark) series, the 6200 series and the PXA900 series, all available at one time from Intel Corporation. Processor 206 is connected to other elements in device 100 through a series of electrical connections to its various input and output pins. Processor 206 has an IRQ input line which allows it to receive signals from various devices. Appropriate interrupt firmware is provided which receives and reacts to the signals detected on the IRQ line.

In addition to processor 206, other internal devices of device 100 are shown schematically in FIG. 8. These include: display 102; speaker 104; keypad 112; sensors 202 (including motion sensor 202A), communication sub-system 802; short-range communication sub-system 804; auxiliary I/O devices 806; serial port 808; microphone port 810 for microphone 116; flash memory 812 (which provides persistent storage of data including local data relating to the status flags used by an embodiment); random access memory (RAM) 814; clock 820 and other device sub-systems (not shown). Device 100 may be a two-way radio frequency (RF) communication device having voice and data communication capabilities. In addition, device 100 preferably has the capability to communicate with other computer systems via the Internet. Device 100 may have a SIM card (not shown).

Sensors 202 and 202A may detect any physical condition around device 100, such as infrared, heat (temperature), light, sounds, movement, acceleration, humidity, stress, pressure, magnetic fields, voltage, current, x-rays, gamma rays, etc. Microphone port 810, keypad 112, auxiliary I/O devices 806, touchpad 108 and other components of device 100 may also provide input signals that may be used as sensors for an embodiment.

Operating system software executed by the processor 206 is preferably stored in a computer-readable medium, such as flash memory 812, but may be stored in other types of memory devices, such as read-only memory (ROM) or similar storage element. In addition, system software, specific device applications, or parts thereof, may be temporarily loaded into a volatile store, such as RAM 814. Communication signals received by the mobile device may also be stored to RAM 814.

Processor 206, in addition to its operating system functions, enables execution of software applications on device 100. A set of software (or firmware) applications, generally identified as applications 816, that control basic device operations, such as voice communication module 816A and data communication module 816B, may be installed on the device 100 during manufacture or downloaded thereafter. Calendar application 816C and address book application 816D provide useful tracking tools for the user of device 100. Data from the calendar application 816C may be used in an embodiment to determine a context for a state of movement for device 100. Calendar application 816C may also process and also generate information on an expected state of activity of device 100 in the near future. Status module 816E monitors and evaluates the status of various capabilities of device 100 (e.g. its communication connections, battery power, available memory, sensors) and updates data stored on device 100 with this information. Module 816E may also generate and send communications to external devices regarding this information on a periodic basis or as statuses change.

Condition analysis module 816F receives data from various components of device 100, such as condition and scaling circuit 204, motion sensor 202A, sensors 202, trigger circuit 204, GPS module 824, RFID module 826, communication module 802, short-range communication sub-system 804, time and day data, calendar data, etc. RFID module 826 may include an RFID transponder and/or an RFID reader. The data collectively can be used to determine whether device 100 is currently active, currently in a sleep mode and to determine any ambient conditions around device 100 based on any data provided from sensors 202. Override (hardware/software) data and switch settings may also be used to determine the activity and/or movement status of device 100. Module 816F may combine calendar application data with the other sources of information to produce a refined view of the device's activity state. Module 816F may generate status messages to external devices and servers, based on received requests or changes in activity. Module 816F may impose thresholds on the activity before sending such status messages.

Activation module 816G receives and extracts any commands from condition analysis module 816F and determines whether to activate/deactivate device 100 and or activate/deactivate one or more components of device 100. In one embodiment signals from sensors 202 are provided to processor 206 for evaluation by module 816G. In another embodiment signals from sensors 202 are provided to module 204 which filters the signals and provides them to processor 206 for evaluation by module 816G.

Although depicted for clarity as distinct modules, modules such as modules 816F and 816G need not be separated from other software or instruction sets, and may be included with or integrated into other sets of instructions. For example, in an interrupt-based system, where processor 206 is selectively moved to a lower-power state, one or more interrupt routines may implement one or more of the functions of modules 816F and 816G, where the interrupt routine receives data from various sensors 202. The interrupt routine may be stored locally on processor 206. As another example, in a circuit-based system one or more circuits may be provided in circuit 204 to generate an interrupt signal connected to the interrupt line of processor 206 to implement one or more of the functions of modules 816F and 816G.

As well, additional software modules, such as software module 816N, which may be for instance a personal information manager (PIM) application, may be installed during manufacture or downloaded thereafter into device 100. Data associated with each application can be stored in flash memory 812.

Data communication module 816B may comprise processes that implement features, processes and applications for device 100 as provided and described earlier, allowing device 100 to generate track status of various components of device 100 and to generate and send messages to external devices.

Communication functions, including data and voice communications, are performed through the communication sub-system 802 and the short-range communication sub-system 804. Collectively, sub-systems 802 and 804 provide the signal-level interface for all communication technologies processed by device 100. Various applications 816 provide the operational controls to further process and log the communications. Communication sub-system 802 includes receiver 828, transmitter 830 and one or more antennas, illustrated as receive antenna 832 and transmit antenna 834. In addition, communication sub-system 802 also includes processing modules, such as digital signal processor (DSP) 836 and local oscillators (LOs) 838. The specific design and implementation of communication sub-system 802 is dependent upon the communication network in which device 100 is intended to operate. For example, communication sub-system 802 of device 100 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 100. In any event, communication sub-system 802 provides device 100 with the capability of communicating with other devices using various communication technologies, including instant messaging (IM) systems, text messaging (TM) systems and short message service (SMS) systems, etc.

In addition to processing communication signals, DSP 836 provides control of receiver 828 and transmitter 830. For example, gains applied to communication signals in receiver 828 and transmitter 830 may be adaptively controlled through automatic gain-control algorithms implemented in DSP 836.

Short-range communication sub-system 804 enables communication between device 100 and other proximate systems or devices, which need not necessarily be similar devices. For example, the short-range communication sub-system may include an infrared device and associated circuits and components, or a Bluetooth (trade-mark) communication module to provide for communication with similarly enabled systems.

Powering the entire electronics of the mobile handheld communication device is power source 840. In one embodiment, power source 840 includes one or more batteries. In another embodiment, power source 840 is a single battery pack, especially a rechargeable battery pack. A power switch (not shown) may serve as an "on/off" switch for device 100. A power source interface (not shown) may be provided in hardware, firmware, software or a combination of such elements to selectively control access of components in device 100 to power source 840. Upon activation of the power switch application 816 is initiated to turn on device 100. Upon deactivation of the power switch, application 816 is initiated to turn off device 100. Power to device 100 may also be controlled by other devices and by software applications 816.

Figure 9:
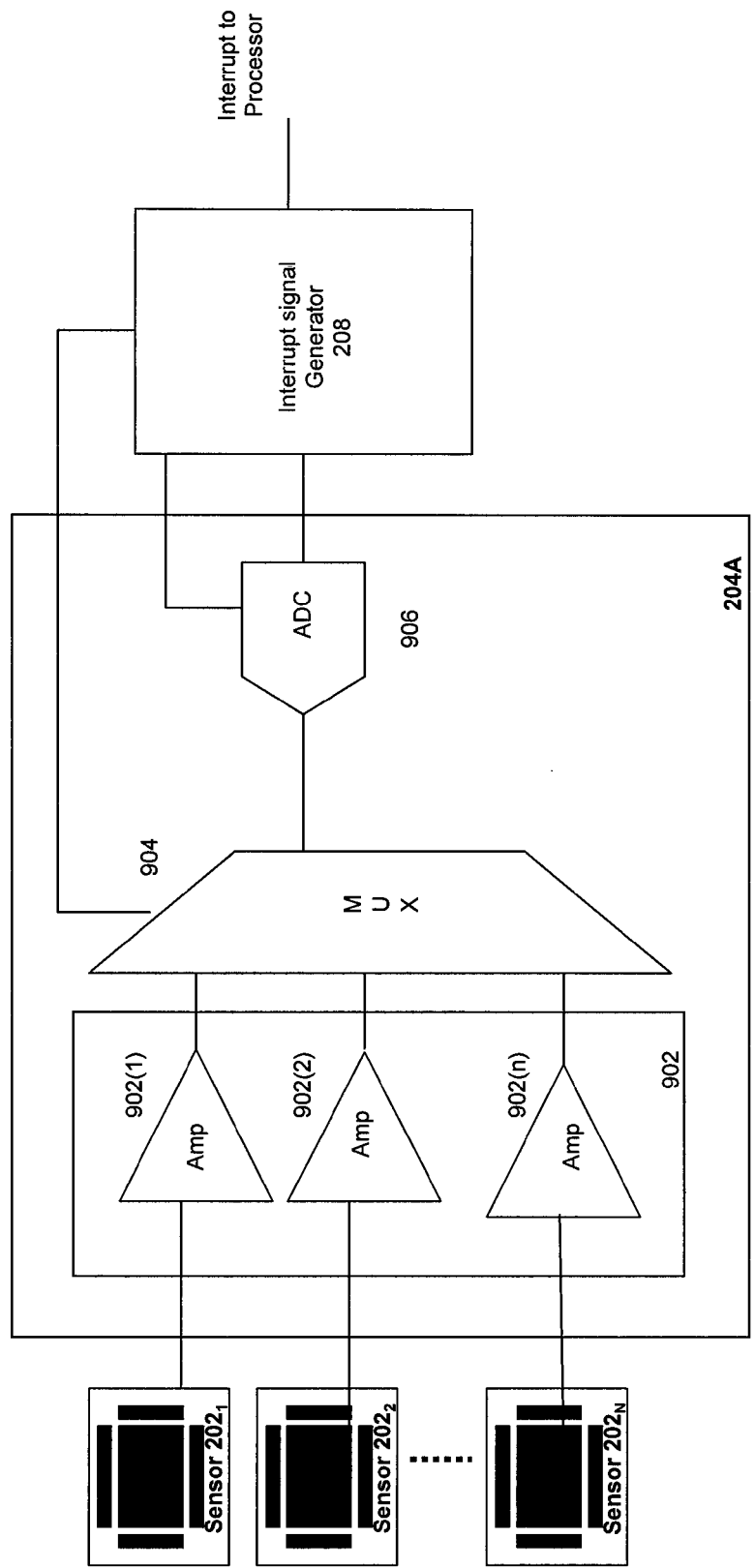
FIG. 9 is a block diagram of two sensor systems used by the activation system of FIG. 1.

Referring to FIG. 9, with some algorithms of an embodiment described, further detail is provided on how aspects of condition and scaling circuit 204 and its related components are provided. Circuit 900 shows N sensors 202 connected to trigger circuit 204 having N amplifiers 902, which then have their outputs attached to an analog mux 904. The mux selectively provides its output according to a control signal generated by logic and interrupt generator 208. The analog output of mux 904 is converted to a set of digital signals by analog to digital converter 906, which then provides the output to logic and interrupt generator 208. The output of generator 208 may be provided as an interrupt signal to processor 206. The functions of the amplifiers, mux, analog to digital signal converters and interrupt generator may reside in processor 206 or may be provided as separate components. As with other implementation, software operating on processor 206 determines when a notable signal has been generated by sensors 202. Reading of positions determined by the software can be stored in memory 812 or 814. The software can also create an average reading of the movement readings. This average reading can be used to determine when device 100 is in a resting position or when it is effectively in a resting position (e.g. it is being moved only in inconsequential amounts).

For any embodiment, a low-g MEMS (micro-electromechanical system) accelerometer may be used for motion sensor 202A. Further, the accelerometer may be of almost any type, including a capacitive, piezoelectric, piezoresistive, or a gas-based accelerometer. An exemplary low-g MEM accelerometer is a LIS302DL tri-axis digital accelerometer, available from STMicroelectronics of Geneva, Switzerland. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals.

Figure 10:
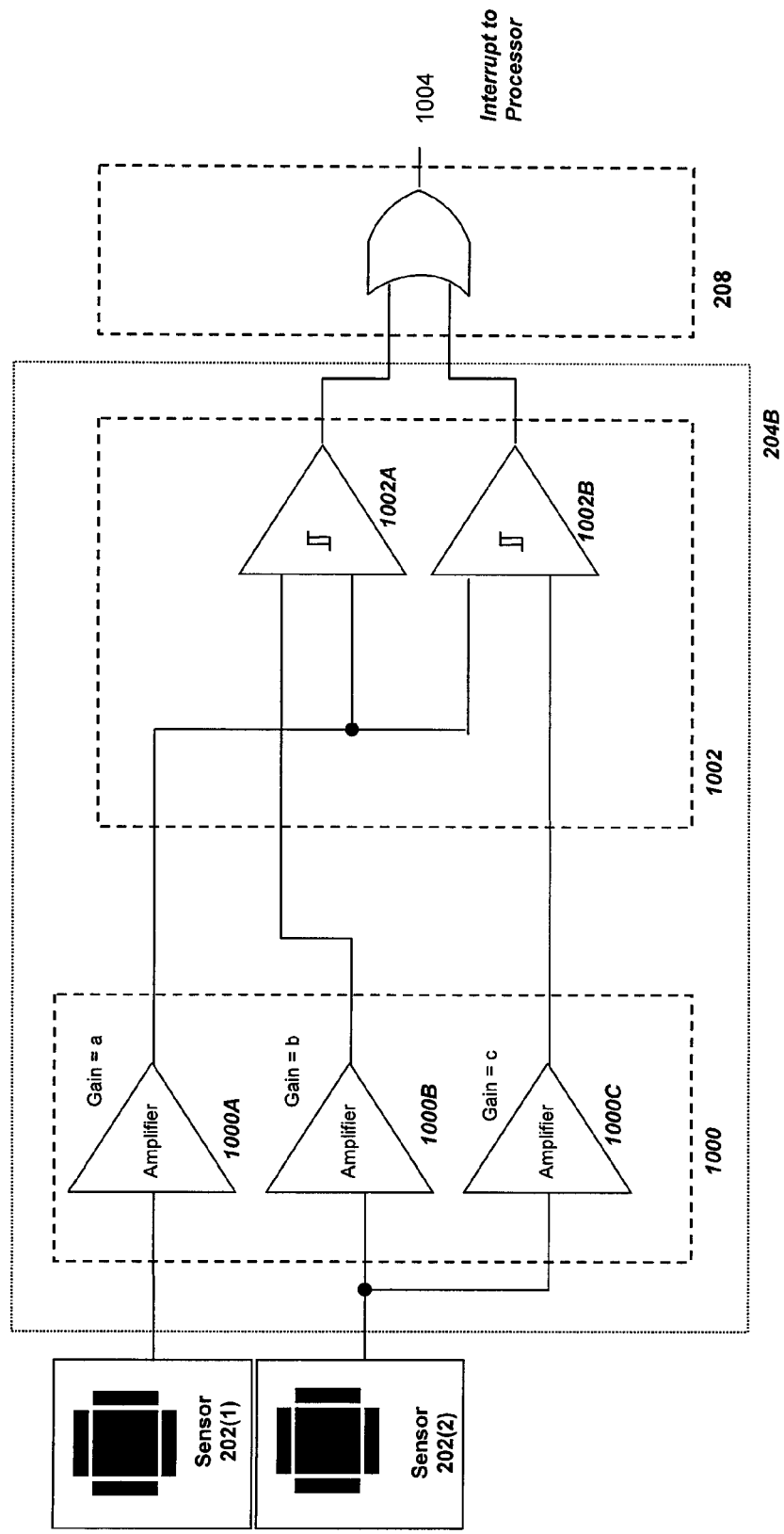
FIG. 10 is a block diagram of another sensor system used by the activation system of FIG. 1.

Referring to FIG. 10, an alternative circuit 204B is shown for sensors 202(1) and 202(2). Briefly, the output of sensors 202 are provided to amplifying stage 1000. Sensor 202(2) is connected in parallel to amplifiers 1000B and C, each providing a gain of "b" and "c". Sensor 202(1) is connected to amplifier 1000A, providing a gain of "a". The output of buffer amp 1000 is provided in tandem to comparator stage 1002. Comparator 1002A compares signals from amplifiers 1000A and 1000B. Comparator 1002 compares signals from amplifiers 1000A and 1000C. The other inputs of comparators 1002A and B provided to interrupt signal generator 208, implemented as an OR gate, which provides trigger signal 1004, which can be provided as an interrupt signal to processor 206. It will be appreciated that the amplifier stage 1002 and interrupt generator 208 can be implemented in other arrangements to implement different triggering logic as dictated by a specific implementation. Other embodiments may use three or more sensors which would have different circuits and logic for amplifiers 1000, comparators 1002 and interrupt signal generator 208.

It will be appreciated that other circuits using different combinations of sensors and triggering components and threshold detectors may be used to provide functionalities of sensor 202A and circuit 204. In other embodiments, a single comparator can be used to perform comparisons. In other embodiments, other sensors 202 (e.g. heat, IR, pressure, etc.) may be connected to a comparable detection circuit to any circuit as provided in FIG. 9 or 10.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

It will be appreciated that the embodiments relating to methods, devices and systems may be implemented in a combination of electronic hardware, firmware and software. The firmware and software may be implemented as a series of modules, applications, processes and/or modules that provide the functionalities described herein.

The algorithms and processes described herein may be executed in different order(s). Interrupt routines may be used. Data may be stored in volatile and non-volatile devices described herein and may be updated by the hardware, firmware and/or software.

The present disclosure is defined by the claims appended hereto, with the foregoing description being merely illustrative of embodiments of the present disclosure. Those of ordinary skill may envisage certain modifications to the foregoing embodiments which, although not explicitly discussed herein, do not depart from the scope of the present disclosure, as defined by the appended claims.

The invention claimed is:

1. An activation circuit for an electronic device, comprising:
   a first heat sensor located on the electronic device in a first location where a user of the electronic device is expected to handle the electronic device;
   a second heat sensor located on the electronic device in a second location where the user is not expected to handle the electronic device; and
   an activation circuit to activate a component in the electronic device when the electronic device is in
      a first environment that is room temperature and a difference in readings between the first heat sensor and the second heat sensor exceeds a first threshold to activate the electronic device at room temperature;
      and the activation circuit further conditionally adjusts readings from the second heat sensor to adjusted readings and activates the component when
         the electronic device is in a second environment having a second environment temperature reading that is less than room temperature whereby the second environment temperature reading is adjusted to a first adjusted reading, and the difference in readings between the first heat sensor and the first adjusted reading from the second heat sensor exceeds a second threshold to activate the electronic device at the temperature, the second threshold being different than the first threshold; and
         the electronic device is in a third environment having a third environment temperature reading that is more than room temperature whereby the third environment temperature reading is adjusted to a second adjusted reading and the difference in readings between the first heat sensor and the second adjusted reading from the second heat sensor exceeds a third threshold to activate the electronic device at the temperature, the third threshold also being different than the first threshold.

2. The activation circuit as claimed in claim 1, wherein the activation circuit evaluates the readings between the first and second heat sensors in a plurality of different temperatures away from room temperature.

3. The activation circuit as claimed in claim 1, further comprising:
   a third heat sensor located on the electronic device in a third location where the user is expected to handle the electronic device; and
   a fourth heat sensor located on the electronic device in a fourth location that is also isolated from effects of the user,
wherein the activation circuit further activates the component when a difference in readings between the third and fourth heat sensors exceeds a fourth threshold.

4. The activation circuit as claimed in claim 3, wherein:
   the activation circuit further activates the component when differences in readings between the third and second heat sensors and from the first and fourth heat sensors exceed a fifth threshold.

5. The activation circuit as claimed in claim 3, wherein the activation circuit sequentially evaluates the difference in readings from the first and second heat sensors and then the difference in readings between the third and fourth heat sensors to determine whether to activate the component.

6. The activation circuit as claimed in claim 3, wherein the activation circuit evaluates in combination the difference in readings between the first and second heat sensors and then the difference in readings between the third and fourth heat sensors to determine when to activate the component.

7. The activation circuit as claimed in claim 3, further comprising:
   a fifth heat sensor located on the electronic device in a fifth location that is also isolated from effects of the user,
wherein the activation circuit further utilizes readings from the fifth heat sensor to determine when to activate the component.

8. The activation circuit as claimed in claim 1, wherein an output of the activation circuit is connected to an interrupt input line of a processor in the electronic device.

9. The activation circuit as claimed in claim 1, wherein the activation circuit utilizes readings from the second heat sensor as a baseline condition to determine when to activate the component.

10. The activation circuit as claimed in claim 3, wherein the activation circuit utilizes data from the second and fourth heat sensors as a baseline conditions to determine when to activate the component.

11. A method for activating a component in an electronic device, comprising:

monitoring readings from a first heat sensor located on the electronic device in a first location where a user of the electronic device is expected to handle the electronic device;

monitoring readings from a second heat sensor located on the electronic device in a second location where the user is not expected to handle the electronic device;

activating a component in the electronic device when the electronic device is in a first environment that is room temperature and a difference in readings between the first heat sensor and the second heat sensor exceeds a first threshold to activate the electronic device at room temperature; and conditionally adjusting readings from the second heat sensor to adjusted readings and activating the component when the electronic device is in a second environment having a second environment temperature reading that is less than room temperature whereby the second environment temperature reading is adjusted to a first adjusted reading, and the difference in readings between the first heat sensor and the first adjusted reading from the second heat sensor exceeds a second threshold to activate the electronic device at the temperature, the second threshold being different than the first threshold; and the electronic device is in a third environment having a third environment temperature reading that is more than room temperature whereby the third environment temperature reading is adjusted to a second adjusted reading, and the difference in readings between the first heat sensor and the second adjusted reading from the second heat sensor exceeds a third threshold to activate the electronic device at the temperature, the third threshold also being different than the first threshold.

12. The method for activating a component as claimed in claim 11, further comprising:

monitoring readings from a third heat sensor located on the electronic device in a third location where a user of the electronic device is expected to handle the electronic device; and activating the component based on readings from the third heat sensor.

13. The activation circuit as claimed in claim 1, further comprising:

a light detector, wherein the activation circuit further utilizes readings from the light detector to determine when to activate the component.

14. The activation circuit as claimed in claim 1, further comprising:

a motion sensor, wherein the activation circuit further utilizes readings from the motion sensor to determine when to activate the component.

15. The method for activating a component as claimed in claim 11, further comprising:

also utilizing reading from a light detector on the electronic device to determine when to activate the component.

16. The method for activating a component as claimed in claim 11, further comprising:

also utilizing reading from a motion sensor on the electronic device to determine when to activate the component.

17. The method for activating a component as claimed in claim 11, further comprising:

adjusting readings from the first heat sensor and activating the component when the user is wearing a glove and the difference in readings between a first adjusted reading of the first heat sensor and a reading from the second heat sensor exceeds a fourth threshold to activate the electronic device, the fourth threshold being smaller than the first threshold.

18. The activation circuit as claimed in claim 1, wherein the activation circuit further adjusts readings from the first heat sensor and activates the component when the user is wearing a glove and the difference readings between a first adjusted reading from the first heat sensor and a reading from the second heat sensor exceeds a fourth threshold to activate the electronic device, the fourth threshold being smaller than the first threshold.

* * * * *